United States Patent [19]

Saadia

[11] Patent Number: 4,753,813
[45] Date of Patent: Jun. 28, 1988

[54] EDIBLE FOOD ARTICLE AND PROCESS OF MAKING SAME

[76] Inventor: Clement C. Saadia, 3700 Osura Road, Albuquerque, N. Mex. 87103

[21] Appl. No.: 10,495

[22] Filed: Jan. 21, 1987

[51] Int. Cl.⁴ .............................................. A21D 10/02
[52] U.S. Cl. ...................................... 426/283; 426/94; 426/138; 426/391; 426/502
[58] Field of Search ................... 426/92, 94, 95, 138, 426/139, 283, 297, 391, 502

[56] References Cited

U.S. PATENT DOCUMENTS 1,850,356  3/1932  Parr ...................................... 426/139
2,509,035  5/1950  Corbett ................................. 426/283
3,410,691  11/1968  Stanley ................................. 426/283
3,912,433  10/1975  Kwok ................................. 425/126 R
4,047,478  9/1977  Trostmann et al. ............... 99/450.1
4,084,493  4/1978  Quintana .............................. 426/297

Primary Examiner—George Yeung
Attorney, Agent, or Firm—Charles E. Temko

[57] ABSTRACT

A pancake type dough skin or wrapper adapted to contain an edible filler which is initially circular or semi-circular in configuration, and which is folded to form a triangular three-dimensional enclosure having closed edges and locking tabs to maintain the shape thereof prior to deep fat or other cooking.

6 Claims, 4 Drawing Sheets

FIG. 7.
FIG. 8.
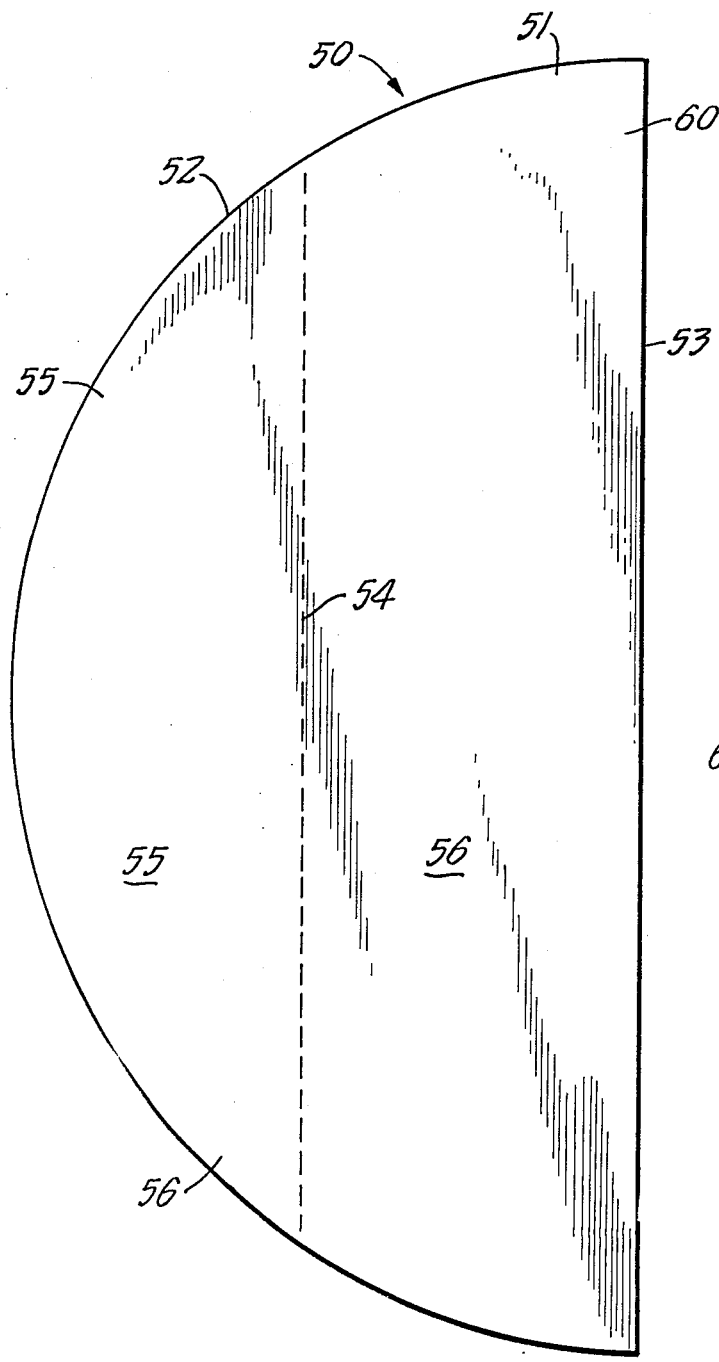
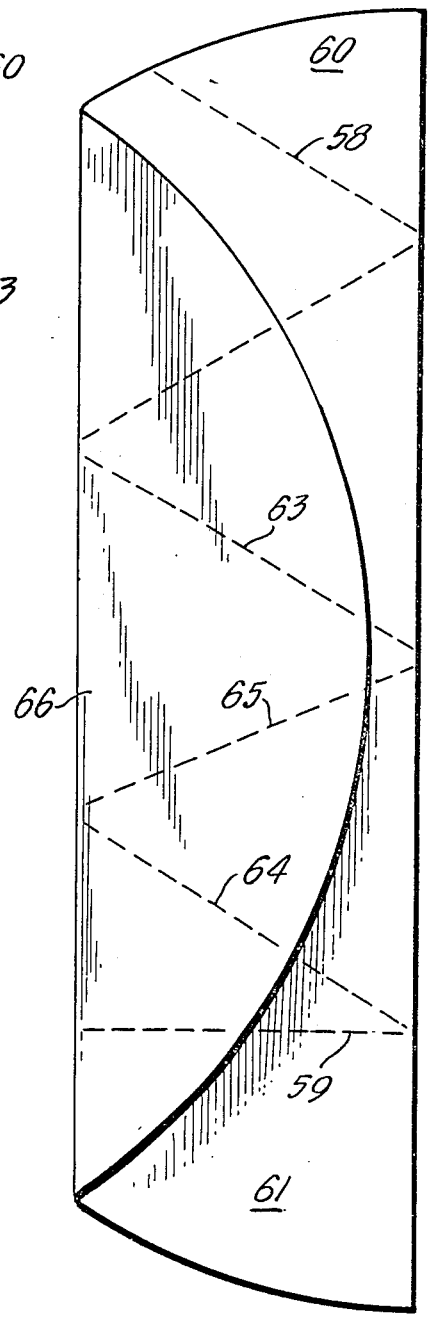

EDIBLE FOOD ARTICLE AND PROCESS OF MAKING SAME

BACKGROUND OF THE INVENTION

This invention relates generally to the field of edible dough products, and more particularly to an improved pie-like comestible suitable for baking or deep fat frying.

Almost every nationality and ethnic group has created its own form of edible product in which a dough-like jacket is employed to contain a particulate filler in chopped, minced, or other similar form. In smaller sizes, the product is often boiled and served with the jacket in cooked moisture laden form to be eaten with a fork or spoon. Other forms, usually larger, are filled and sealed to be subsequently subject to a steaming or deep-fat frying operation. Typical are Chinese eggrolls, blintzes, and the like. Still others are baked to form filled pastries. An alternate form employs the baking of a hollow shell in cone form to be filled after baking with ice cream or other confections.

In the case of the fried product, the jacket for skin is usually formed as a flat pancake which has been partially cooked or pan fried to acquire sufficient mechanical strength for filling. The pancake may be partially folded to form a pocket, and after filling, the pocket is closed in one manner or another to maintain the contents in enclosed condition during and after cooking. Once cooled, the skin acquires additional rigidity, and the product may be hand held by a user while consumed. It is to this particular variety of product to which the present invention has application.

For the most part, the prior art products are normally rectangular in configuration, as in the case of a blintz, or cylindrical as is the case with an egg roll. Most triangular forms are confined to baked products which are cooked on trays or racks, and in which the possibility of loss of filler is minimal. Few of such products are capable of short-order filling and cooking suitable for a fast food operation. It is also desirable, if not essential, that the finished product remain substantially leak or spill-free during the course of consumption by the user.

SUMMARY OF THE INVENTION

Briefly stated, the invention contemplates the provision of an improved comestible product of the type described which fulfills the above mentioned requisites. To this end, there is provided a thin pancake skin which is of circular configuration in unfolded form, and which is partially folded to open triangular configuration prior to filling, following which the opening used for filling is further folded and sealed before cooking. The folding process forms tab-like appendages which are hand pressed against the main body of the skin to form a seal which is maintained during the cooking or frying operation. Once cooked or fried, the product may be eaten, commencing at one of the three corners, the structural integrity of the product being maintained until substantially all of the same has been consumed.

BRIEF DESCRIPTION OF THE DRAWING

In the drawing, to which reference will be made in the specification, similar reference characters have been employed to designate corresponding parts throughout the several views.

FIG. 7 is a view in elevation corresponding to that seen in FIG. 1, but showing a second embodiment of the invention.

FIG. 8 is a view in elevation showing a first folding stage of the second embodiment.

DETAILED DESCRIPTION OF THE DISCLOSED EMBODIMENTS

Figure 1:
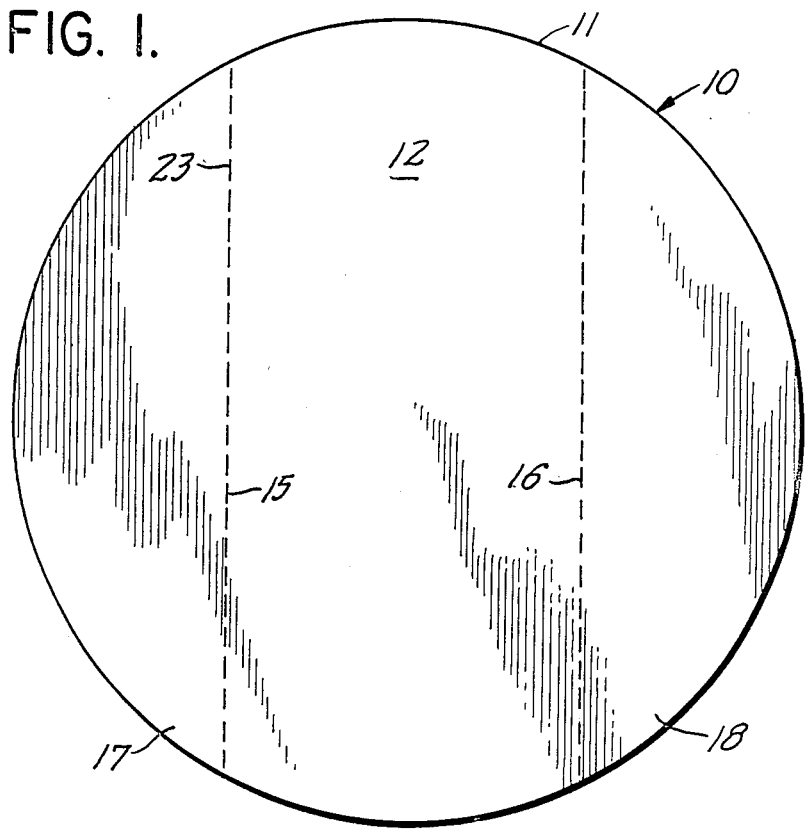
FIG. 1 is a view in elevation showing a formed pancake embodying the invention prior to folding.

In accordance with the first embodiment of the invention, reference character 10 designates a flat circular pancake of the usual type used for food products of this type, consisting of thin pan fried dough. The pancake 10 is bounded by an arcuate peripheral edge 11, and first and second surfaces 12 and 13 (see FIG. 2).

Figure 2:
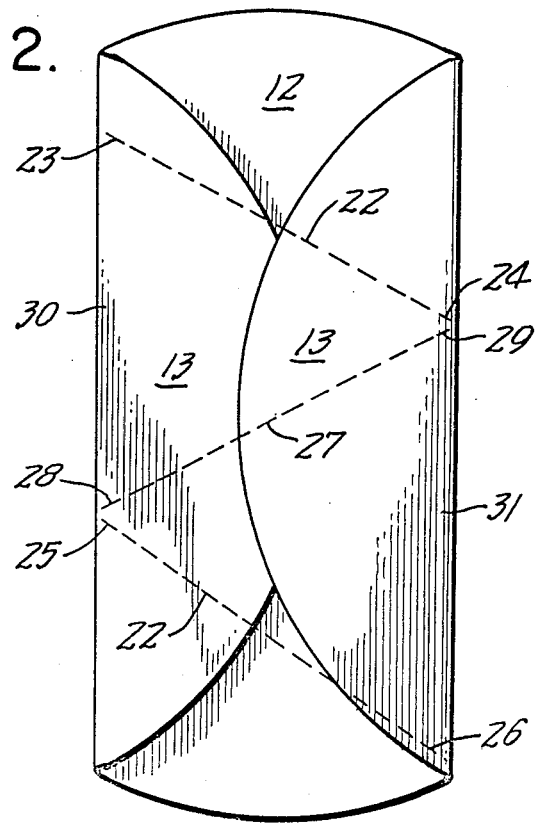
FIG. 2 is a similar view showing a first folding stage.

During a first folding stage, there is first formed a pair of parallel fold lines 15 and 16 defining sector-shaped flaps 17 and 18 which overlie a central portion 19. A second stage includes the formation of first and second parallel fold lines 21 and 22 which extend across the pancake as seen in FIG. 2. The line 21 has first and second ends 23 and 24. The line 22 has first and second ends 25 and 26. Interconnecting the ends 23 and 26 is a single fold line 27 having first and second ends 28 and 29.

Figure 3:
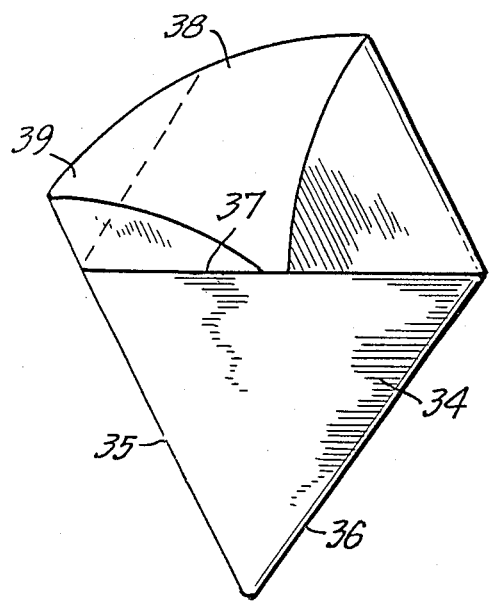
FIG. 3 is a view in elevation showing a second folded stage prior to filling.
Figure 4:
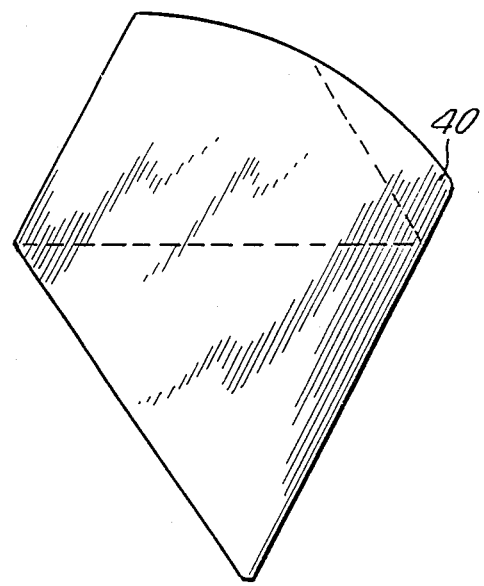
FIG. 4 is a view in elevation showing the side opposite that seen in FIG. 3.
Figure 5:
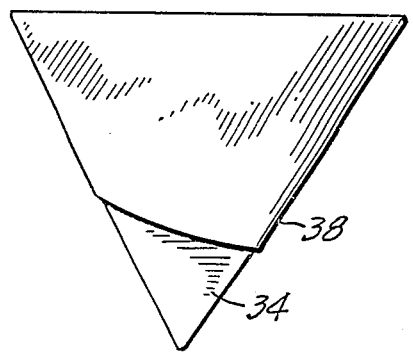
FIG. 5 is a view in elevation showing a final stage of assembly.
Figure 6:
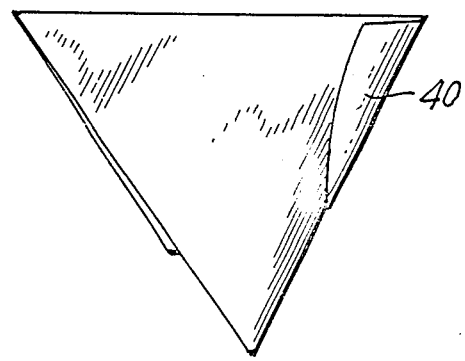
FIG. 6 is a view in elevation showing the side opposite that seen in FIG. 5.
Figure 9:
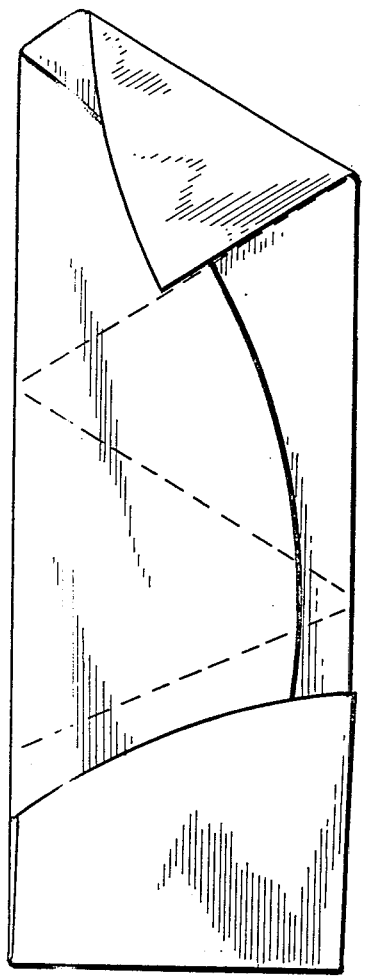
FIG. 9 is a view in elevation showing a second folding stage of the second embodiment.

These lines delineate first and second triangular areas 30 and 31, which form a food retaining pocket as may be seen in FIG. 3. In this figure, the pocket 34 is bordered by first and second closed edges 35 and 36 and an open edge 37 through which the same is filled. A closing flap 38 overlies the edge 37, and after filling, the same is folded downwardly as seen in FIG. 5 to effectively close the pocket 34. Following this operation, the small reinforcing flap 40 (FIG. 4) is formed from a corresponding area 39 (FIG. 2), and it is folded about the edge 35 and gently pressed in position to completely seal the product. In this condition, it can be boiled, deep fat fried, or pan fried without fear of the loss of contents. It is contemplated that the embodiment shown in FIGS. 1 through 5, which is of substantial size, will be consumed as a hand held envelope, and if eaten by commencing the first bite at one of the three corners, the contents will normally be maintained within the skin until substantially the entire product has been consumed.

Turning now to the second embodiment of the invention, generally indicated by reference character 50, and illustrated in FIGS. 7 through 12, inclusive, this embodiment differs from the first embodiment principally in the size of the pocket formed. It is suitable for use where the contents are relatively expensive, or a more bite-sized product is otherwise desired.

Referring to FIG. 7, the blank 51 is formed by cutting a pancake 10 of the first embodiment diagonally in half, so that the same is bounded by a semi-circular edge 52 and a rectilinear edge 53. During the first stage of folding, a single fold line 54 forms a single flap 55 which is folded to overlie a main body portion 56 (FIG. 7). As the folded blank is now considerably longer relative to its width, as compared to the first embodiment, first and second end fold lines 58 and 59 are employed to form end flaps 60 and 61. These flaps are shown in folded condition in FIG. 8.

Once the blank 51 has been placed in this condition, there are next formed first and second parallel fold lines 63 and 64 and the single fold line 65 which define first and second triangular areas 66 and 67 as in the first embodiment. These areas will ultimately be enclosed by relatively larger sealing flaps 68 and 69.

Figure 10:
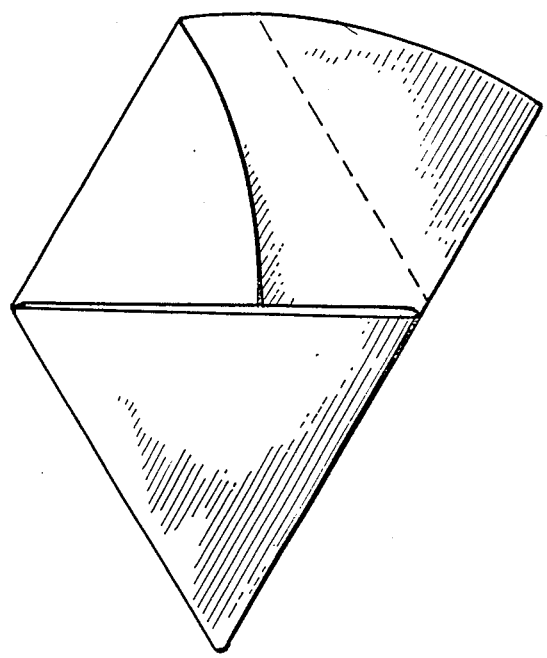
FIG. 10 is a view in elevation showing a third folding stage of the second embodiment.
Figure 11:
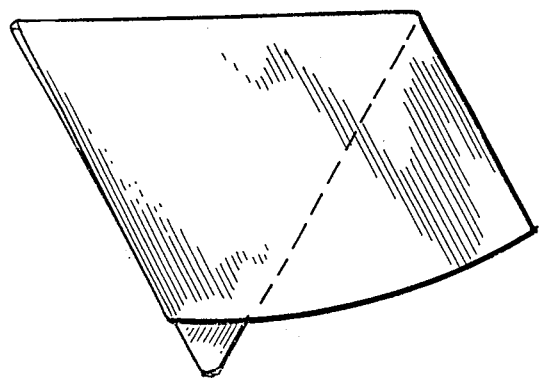
FIG. 11 is a view in elevation showing a fourth folding stage of the second embodiment.
Figure 12:
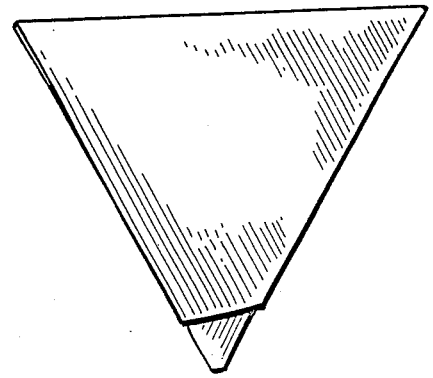
FIG. 12 is a view in elevation showing a completed second embodiment.

FIG. 10 shows the filling opening 71 leading to a triangularly shaped pocket. FIG. 11 shows the pocket in partially enclosed condition, and FIG. 12 shows the completely folded triangular product ready for a cooking operation. As contrasted with the finished product in the first embodiment which has sides approximately six inches long, the second embodiment has sides approximately three and one-half inches long, and will normally be consumed using only two or three bites.

Aside from the novel and attractive appearance afforded by the invention, the triangular shape of the finished product formed from a circular or semi-circular pancake allows improved facility in handling, since, by virtue of the sealing flaps which overlie the opening to the enclosed pocket, and the large area of such flaps which can be pressed against the main body portion of the product, a much greater degree of mechanical strength is obtained than if the product were to be formed by merely overlying a pair of congruent laminae, and then sealing the edges by pressing, as is the case with such products as ravioli and the like.

I wish it to be understood that I do not consider the invention limited to the precise details of structure shown and set forth in this specification, for obvious modifications will occur to those skilled in the art to which the invention pertains.

I claim:

1. A method of preparing a food product of edible skin type comprising the steps of:
    (a) providing a generally circular thin dough pancake;
    (b) folding said pancake by forming two opposed overlapping sectors at a pair of spaced parallel fold lines;
    (c) commencing at diagonally opposed corners, forming a pair of parallel fold lines each disposed at an angle with respect to an adjacent previously formed fold line;
    (d) forming a single fold line interconnecting said second mentioned pair of fold lines at oppositely disposed ends thereof;
    (e) folding said pancake along said last mentioned pair and single fold line to form a substantially triangularly shaped enclosure having an opening and a foldable sealing flap adjacent said opening;
    (f) filling said enclosure with an edible filler; and
    (g) folding said sealing flap over said opening to close the same.

2. In the method of claim 1, the additional steps of:
    (h) forming a pair of locking flaps adjacent the ends of said second mentioned pair of fold lines;
    (i) folding one of said locking flaps upon said enclosure prior to filling; and
    (j) folding the other of said locking flaps over said sealing flap after said sealing flap has been folded to close said opening.

3. A method of preparing a food product of edible skin type comprising the steps of:
    (a) providing a generally circular thin dough pancake;
    (b) folding said pancake by folding at least one overlapping sector;
    (c) commencing at diagonally opposed corners, forming a pair of parallel fold lines each disposed at an angle with respect to an adjacent previously formed fold line;
    (d) forming a single fold line interconnecting said second mentioned pair of fold lines at oppositely disposed ends thereof;
    (e) folding said pancake along said last mentioned pair and single fold line to form a substantially triangularly shaped enclosure having an opening and a foldable sealing flap adjacent said opening;
    (f) filling said enclosure with an edible filler; and
    (g) folding said sealing flap over said opening to enclose the same.

4. The method set forth in claim 3 further characterized in said pancake being of full circular configuration prior to folding.

5. The method set forth in claim 3 further characterized in said pancake being of semicircular configuration prior to folding.

6. The product of the method set forth in claim 3.

* * * * *